Dec. 11, 1928.  1,694,966

R. C. CLINKER

ELECTRICAL SYSTEM

Filed May 24, 1927

Inventor:
Reginald C. Clinker
by
His Attorney

Patented Dec. 11, 1928.

1,694,966

UNITED STATES PATENT OFFICE.

REGINALD C. CLINKER, OF BILTON, NEAR RUGBY, ENGLAND, ASSIGNOR TO GENERAL ELECTRIC COMPANY, A CORPORATION OF NEW YORK.

ELECTRICAL SYSTEM.

Application filed May 24, 1927, Serial No. 193,816, and in Great Britain July 13, 1926.

My invention relates to electrical systems for obtaining a high voltage from a low voltage direct current source, and has for its principal object the provision of an improved apparatus and method of operation whereby the power from such a source may be supplied at a high voltage.

In accordance with the invention, an increased voltage is obtained from a source of direct current voltage by charging a condenser from the source through an electric valve, and then reducing the capacity of the condenser. Owing to the decreased capacity, and the prevention of current flow in the reverse direction from that of the charging current due to the existence of the valve, the potential at the terminals of the condenser is increased.

When a continuous voltage higher than that of the source is required, the increased voltage at the terminals of the condenser is supplied to a second condenser through an electric valve, the capacity of the first condenser being continuously varied between maximum and minimum values. The second condenser serves to smooth out fluctuations in the potential supplied from the first condenser, and should preferably be of considerable capacity, the higher voltage being taken from the terminals of the second condenser.

It is evident, also, that the first condenser should be so constructed as to have a considerable maximum capacity, and a low minimum capacity, since the increase of voltage depends on the diminution of capacity obtainable in the first condenser.

My invention will be better understood from the following description when considered in connection with the accompanying drawings and its scope will be pointed out in the appended claims.

Figure 1:
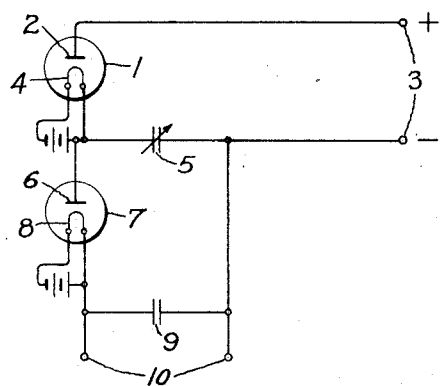
Figure 2:
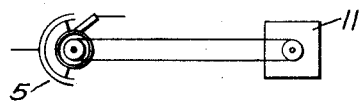
Figure 3:
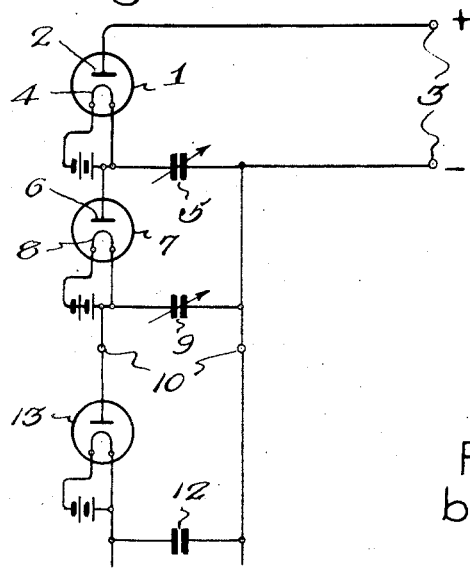

Referring to the drawings, Fig. 1 is a wiring diagram of a system wherein my invention has been embodied; and Fig. 2 shows a modified embodiment of the variable condenser which is utilized to step-up the voltage; and Fig. 3 shows a modification of the system illustrated by Fig. 1.

In carrying the invention into effect, we preferably make use of a thermionic valve or rectifier 1, the anode 2 of which is connected to the positive terminal of the source 3, and the cathode 4 to one terminal of the variable condenser 5, the other terminal of which is connected to the negative supply terminal. The anode 6 of the second valve 7 may then be connected to the cathode 4 of the preceding valve 1, and the cathode 8 of the second valve 7 to the terminal of a fixed condenser 9, the other terminal of which is connected to the negative supply terminal. The high voltage current is supplied through leads 10. It will be evident, of course, that the valve would be equally efficacious if connected to the negative supply terminal, in which case the cathode would be connected to such terminal, and the anode to one terminal of the first condenser, or it might be found desirable to place valves in both positive and negative sides of the supply.

As indicated by Fig. 2, the variable condenser 5 may be of curved plates adapted to be moved with respect to one another by means of any suitable means such as a driving motor 11.

Where a plurality of circuits containing valves and condensers are employed in order to obtain a high voltage, the arrangement may consist of a plurality of valves connected in cascade, the anode or cathode of the first valve being connected to the positive or negative supply terminal, a variable condenser being connected to the junction between the cathode of one valve and the anode of the next valve, the other terminal of the condensers being connected together and to the negative or positive supply terminal according to the connection of the valves. The cathode or anode of the final valve is connected through a condenser to the negative or positive supply terminal as may be necessary, at the terminals of this condenser the high voltage being obtainable.

A further increase in voltage may be obtained by making the second condenser variable as indicated by Fig. 3 and supplying the potential at the terminals of the second condenser to a circuit comprising an electric valve 13 and another condenser 12, as many more of these being provided as may be necessary in order to obtain the voltage desired. The variable condensers 5 and 9' should preferably have their capacity varied at the same periodicity and the condenser in the succeeding circuit should have its variation in capacity in opposite phase to that of the condenser in the preceding circuit, that is to say, when one condenser has a maximum capacity the condenser in the next circuit should have a minimum capacity and so on.

As already described, the connection of the valves may be in the positive or negative supply lead, and may be alternately in one lead or the other.

The arrangement will thus consist of a plurality of cascade-connected circuits comprising a valve and a capacity, the succeeding circuits being connected across the capacity in the preceding circuit.

The arrangement may be used for various purposes, for example, for operating cathode ray tubes, and enables a small direct current at a high voltage to be obtained from a low voltage direct current supply.

The embodiments of the invention illustrated and described herein have been selected for the purpose of clearly setting forth the principles involved. It will be apparent, however, that the invention is susceptible of being modified to meet the different conditions encountered in its use, and I therefore aim to cover by the appended claims all modifications within the true spirit and scope of my invention.

What I claim as new and desire to secure by Letters Patent of the United States, is:—

1. The combination of a plurality of electric valves, a low voltage circuit, a variable condenser connected to said low voltage circuit through one of said valves, and a high voltage circuit connected to said condenser through another of said valves.

2. The combination of a plurality of electric valves, a low voltage circuit, a variable condenser connected to said low voltage circuit through one of said valves, a high voltage circuit connected to said condenser through another of said valves, and smoothing means connected to said high voltage circuit.

3. The combination of a plurality of electrical valves connected in series with one another, a variable condenser, a low voltage circuit connected to one of said valves through said condenser, and a high voltage circuit connected to another of said valves through said condenser.

4. The method of interchanging power between high and low voltage circuits connected to a variable condenser through electrical valve means which comprises cyclically varying the capacity of said condenser.

In witness whereof, I have hereunto set my hand this sixth day of May, 1927.

REGINALD C. CLINKER.